United States Patent Office 3,553,001
Patented Jan. 5, 1971

3,553,001
PROCESS FOR COATING TITANIUM DIOXIDE ON SOLID MATERIALS
Hanswolfgang Kohlschutter, Helmut Getrost, Walter Reich, Hubert Rossler, and Walter Horl, Darmstadt, Germany, assignors to E. Merck A.G., Darmstadt, Germany
No Drawing. Continuation of application Ser. No. 469,328, July 2, 1965. This application Jan. 2, 1969, Ser. No. 791,861
Int. Cl. B44d 1/12; C03c 17/22
U.S. Cl. 117—100
14 Claims

ABSTRACT OF THE DISCLOSURE

A process for the production of coatings based on titanium dioxide, which process comprises feeding two solutions concurrently to an aqueous suspension of material to be coated having a temperature of about 50–100° C. and a pH between 0.5 and 3.5, said two solutions being
(a) an aqueous 0.001 to 0.2 molar solution of a titanium salt having a content in free acid corresponding to a normality of 0.002 to 1.5; and
(b) an aqueous 0.025 to 8 normal alkali metal base with the provision that the feeding of the alkali metal base is maintained so that it is just capable of neutralizing the acid contained in the titanium salt solution as well as the acid produced during the reaction, and that the quantity of titanium salt added per minute is kept within the order of magnitude of about 0.01 to $20 \times 10^{-5}$ moles per square meter of surface to be coated.

---

This application is a continuation of application Ser. No. 469,328, filed July 2, 1965, and now abandoned.

This invention relates to a novel process for the production of titanium dioxide coatings, and in particular to the production of improved nacreous pigments.

Several methods are known for applying titanium dioxide coatings onto various surfaces, such as, for example, the hydrolysis of titanium tetrachloride films by means of water vapor; the hydrolysis of titanic acid ester layers or solutions thereof in organic solvents (U.S. Pats. No. 2,768,909 and No. 2,943,955); or evaporating metallic titanium onto the surface and subsequent oxidation (German Pat. No. 855,767). Depending upon the method used, the coatings serve to modify the optical properties of the coated articles, for example by changing the reflecting power, or by the production of interference colors, as well as serving to obtain resistant coatings, or for the production of intermediate layers in order to be able to apply further coatings with greater adherence. The coated base can be any substance, such as, for example, glass, metals, or plastics.

Some coatings are produced so that they can be removed mechanically from the coated surfaces in order to obtain in this manner flake-shaped titanium dioxide pigments having iridescent properties (U.S. Pats. No. 3,071,-482 and No. 2,941,895, as well as German Patent 1,136,-042). It has also been proposed to combine the pigment properties of fine-particulate mica flakes with those properties of titanium dioxide and possibly to precipitate the pigment onto the mica (U.S. Pat. No. 2,278,970). A method for the production of such mica pigments coated with titanium dioxide is described in U.S. Pat. No. 3,087,-828. According to this method, finely divided mica flakes in aqueous suspension are coated with a titanium dioxide hydrate by hydrolysis of a dilute sulfuric titanium(IV) oxide sulfate solution, at boiling temperature.

It is not possible to obtain, with the previously known methods, very uniform titanium dioxide coatings of an accurately defined thickness of the coating. Only such methods which are conducted via the gas phase yield good results, but they are technically difficult and economically unattractive.

A principal object of this invention, therefore, is to provide a novel and improved process for the production of titanium dioxide coatings.

Another object is to provide novel coating compositions for depositing titanium dioxide.

A further object is to provide improved nacreous pigments.

Upon further study of the specification and claims, other objects and advantages of the present invention will become apparent.

These objects are achieved by the discovery that the hydrolysis and, if desired, the oxidation of dilute, aqueous acidic titanium salt solutions leads, under quite specific and precisely maintained conditions, to very uniform coatings of titanium dioxide hydrates on a wide variety of surfaces.

It should be noted that one of the characteristic and most important features of the present invention is the charging rate of the titanium salt in moles per minute per square meter of surface to be coated.

The process of this invention avoids the use of a gas phase, as well as the utilization of complicated mechanical devices. According to the invention, neither organic solvents nor corrosive inorganic substances are employed; rather, the method is conducted merely in an aqueous, weakly acidic medium, whereby it is no longer necessary to use a specially selected corrosion-resistant material for the vessel, on the one hand, and to employ safety measures because of flammable organic solvents, on the other hand.

Titanium dioxide coatings with the desired excellent properties can be produced only if a whole series of factors are adjustably correlated during the manufacturing process. Therefore, one aspect of this invention resides in the strict correlation of the process variables which, inturn, leads to unexpectedly excellent final products.

With respect to the process which yields the desired excellent properties, it comprises adding to an aqueous suspension of materials to be coated, said suspension having a temperature of about 50–100° C. and a pH of between 0.5 and 3.5, a first stream of an aqueous 0.001–0.2 molar solution of a titanium salt containing free acid corresponding to a normality of 0.002–1.5, and simultaneously therewith, a second stream of an aqueous 0.025 to 8 normal alkali metal base. The charging rate of the base is maintained so that it is just capable of neutralizing the acid contained in the titanium salt solution as well as the acid produced during the reaction. The charging rate of the titanium salt is maintained on the order of magnitude of about 0.01 to $20 \times 10^{-5}$ moles titanium salt per minute per square meter of surface to be coated.

In accordance with the invention, the hydrolysis is conducted in aqueous solutions at between 50 and 100° C., preferably between 70 and 80° C. in this hydrolysis, care must be taken that the quantity of titanium salt or the quantity of titanium dioxide hydrate produced therefrom, respectively, fed during a certain unit of time, is commensurate with the surface to be coated, i.e., that it is substantially completely taken up by the surface and does not remain in the reaction liquid in free suspension. When a titanium salt having a valence less than IV is employed, it is necessary to conduct the process with the simultaneous use of an oxidizing agent.

Suitably, the hydrolysis is conducted so that the articles or substances to be coated are inserted in the water so that they form a suspension or, in the case of articles, are suspended from above. After the suspension has been heated to the necessary temperature (about 50 to 100° C.), a dilute aqueous, 0.001 to 0.2 molar titanium salt solution is fed, under stirring, preferably underneath the level of the liquid, this salt solution containing a content of free acid corresponding to a normality of 0.002 to 1.5. At the same time, a dilute aqueous base is fed into the suspension. This base is necessary for neutralizing both the acid contained in the titanium salt solution and the acid continuously produced during the hydrolysis.

The titanium salt solution, as well as the base, are preferably fed via suitable metering devices. Suitable metering devices include, for example, proportioning pumps and rotameters.

When using titanium II salt solutions, an oxidation is additionally required. The preferred oxidizing agent is oxygen, more preferably in the form of air, and the necessary quantity is taken up from the air at the air-liquid interface, preferably by merely subjecting the suspension to severe agitation. Where the shape of the vessel is not conducive to air diffusion at the surface, it is also possible to bubble a stream of air through the suspension liquid. Suitable titanium III salts are those which are water-soluble (i.e., at least in acid aqueous solution) preferably those of strong acids, particularly titanium III chloride, bromide or sulfate. Suitable titanium IV salts are particularly the chloride or the bromide, or also the titanyl sulfate. The anion portion of the salts is rather unimportant.

As the aqueous base, alkali metal hydroxide solutions are particularly useful, the preferred species being sodium hydroxide or potassium hydroxide. Suitably, 0.025 to 8 normal base solutions are used. The quantity of the dilute base fed per unit of time can be varied within narrow limits without encountering undesired by-products. It has been discovered that pH value in the range of 0.5 to 3.5, particularly between 1.5 and 2.5, are particularly suitable for the production of good coatings.

According to the process of this invention, it is thus possible to supply the surfaces to be coated with only enough titanium salt per unit of time that the entire titanium hydroxide or titanium dioxide hydrate can be deposited on the surfaces without the occurrence of mobile by-products in the suspension liquid.

Based on the assumption that, on the surfaces to be coated, there is first formed a mono-molecular film of titanium dioxide hydrate having a structure corresponding to anatase, then there would be required for coating a surface of 1 m.$^2$ about $1.9 \times 10^{-5}$ moles titanium salt, assuming further that the orientation takes place such that the stretched titanium dioxide molecules lie parallel to the boundary area. Such assumptions surely do not correspond to actual conditions; but they do permit an estimate of the required proportion of titanium ions to the base material. This estimated value can then be used as a starting point. Depending upon the substance to be coated, a determination can be made by conventional experiments of the delivery rate and/or concentration at which the titanium salt is still absorbed, and conversely at which rate and/or concentration titanium dioxide hydrates appear in the liquid. It is also obvious that by varying the choice of the concentration of the employed titanium salt solution, or the feeding rate, the other variable is affected, and that both variables will affect to some degree the required proportion of titanium dioxide or hydrous titanium dioxide to saturate the surface of the base material.

The quantities of titanium salt used per minute are on the order of 0.01 to $20 \times 10^{-5}$ moles of titanium salt per square meter of surface to be coated.

The reaction can be widely varied with respect to time, depending upon which titanium salt solution is used and which materials are to be coated. Of course, the quantities employed also play a significant role. It is, for example, possible to obtain a coating on certain supports after about 1 to 4 hours (for example in the case of barium sulfate), while considerably longer periods are required—up to several days—in the case of other support materials.

By virtue of the chemistry involved, hydrous titanium dioxide coatings are produced according to the process of the invention. These coatings can be dehydrated wholly or partially by simply allowing them to stand in air, or by forced drying. The higher the temperatures are selected for the drying process, for example when roasting the coated materials until they glow, the less water is found in the coating, and the more one can observe the anatase lines in the X-ray diagram. If the drying is carried out at higher temperatures, there can be observed in the X-ray diagram, in addition to the lines of the basic body, those of the rutile.

By this invention, the most various materials, in the most varied shapes, can be coated with titanium dioxide or hydrous titanium dioxide coatings. However, there is the obvious qualification that the substances to be coated should not readily dissolve or decompose in the weakly acidic suspension medium at temperatures of about 50 to about 100° C. Aside from the disappearance of the base material, the release of foreign ions or molecules into the reaction medium interferes with the coating process.

For examples of substances which can be coated without difficulty, the following are cited: minerals, for example mica or graphite, glass, plastics, metals, or other artificial or natural inorganic or organic products, such as, for example, barium sulfate, or also luminescent substances, such as calcium tungstate, zinc silicates which have been activated by manganese, cadmium silicates, or cadmium borates, or also calcium halophosphates which have been activated by manganese, antimony or cerium.

It is also possible to coat larger continuous surfaces with titanium dioxide in the manner described above. It is preferred, in this connection, to insert the respective bodies in a suspension of a finely divided material of the same or different composition, which is then likewise coated with titanium dioxide, so that the entire surface area available is sufficient to prevent the prolonged presence of free hydrous titanium dioxide nuclei in the suspension liquid. If, for example, it is desired to coat large glass plates with titanium dioxide according to the invention, it is recommended to insert these glass plates into a suspension of mica flakes or glass beads.

In accordance with this invention, there are obtained products coated with titanium dioxide or titanium dioxide hydrate which particularly excel with respect to uniformity of the coating. The coated materials thus possess all improved properties associated with such uniform titanium dioxide or titanium dioxide hydrate coatings, such as good reflection, clarity, transparency, corrosion resistance, etc.

Without further elaboration, it is believed that one skilled in the art can, using the preceding description, utilize the present invention to its fullest extent. The following preferred specific embodiments are, therefore, to be construed as merely illustrative, and not limitative of the remainder of the specification and claims in any way whatsoever.

EXAMPLE 1

Ten g. mica, of the commercial type ORS, ground wet to provide a surface area of 2.3 m.$^2$/g., as determined by the BET method (Journal of the American Chemical Society, vol. 60 (1938), p. 309, and vol. 62 (1940), p. 1723), are suspended in 1 liter of water. The suspension has a pH of 6.8 and is heated, under stirring, to 74° C. During the coating procedure, a gentle stream of air is conducted into the suspension through a glass frit. By means of a metering pump, a 0.0324 molar titanium III chloride solution having 0.118 N hydrochloric acid is fed underneath the level of the liquid at a rate of 225 ml./h. After the pH value of the suspension decreases to 2.3, which takes 5 minutes, a 0.22 normal aqueous sodium hydroxide solution is fed into the suspension with a second metering pump. The progressive coating of the mica surface with the titanium dioxide hydrate can be observed from the occurring Newton's interference colors. The iridescence of the mica flakes in the suspension, which was weak at the start of the experiment, becomes stronger as the experiment progresses. Starting from a light grey-blue, the known color stages are passed through and can be followed by taking samples and visual control thereof (for example in a test tube) with incident light.

The above-described mode of experimentation is repeated several times, the experiment being terminated at the colors white, yellow, red, blue, and green. The final pH value lies between 1.9 and 1.7. The proportion of the number of moles of titanium dioxide used per square meter per minute is, in the present case, $5.3 \times 10^{-6}$. After obtaining the desired color tone, the suspension is filtered off, washed free from chloride in hot water, and dried at 200° C. Half the substance thus obtained is roasted at 500° C. Drying and roasting do not result in a change of the interference colors. The X-ray diagram of both products shows, in addition to the lines of the mica, those of anatase. In the experimental vessel (5 liter glass beaker) there can be observed a very uniform coating on the walls and on the bottom, proven by the uniform interference color occurring at these places. The quantities of the solutions which are required for achieving the respective color, as well as the duration of the coating process and the content of titanium dioxide of the final products can be seen from the following table:

TABLE 1

| Duration | Consumption of— | | Percent TiO₂ in the final product | | Color |
| --- | --- | --- | --- | --- | --- |
| | 0.0324 molar TiCl₃ solution, ml. | 0.22 normal NaOH ml. | 200° C. | 500° C. | |
| 3′40″ | 825 | 805 | 17.8 | 18.4 | White. |
| 5′25″ | 1,218 | 1,198 | 24.6 | 25.7 | Yellow. |
| 6′15″ | 1,405 | 1,385 | 27.7 | 28.4 | Red. |
| 8′10″ | 1,837 | 1,817 | 34.3 | 34.9 | Blue. |
| 9′15″ | 2,080 | 2,060 | 36.8 | 38.2 | Green. |

In order to be able to measure the quality of the coatings optically, two well-cleaned object slides are inserted in the mica suspension, in three experiments, final color white. After the first coating, water is used for rinsing, and thereupon a second and a third coating process are conducted, with a further rinsing, then drying at 200° C. The uniformity of the coating can be seen from the curve of a Beckmann spectrophotometer. The curve was obtained by disposing the coated object slide at a right angle to the direction of the rays and by measuring its absorption curve. The occurrence of an absorption band at 590 mμ shows an interference minimum.

For a one-coat layer, a transparency difference of 15 to 20% between maximum and minimum is substantial, because in the case of interference filters (reflection filters) which are made up of light-permeable layers, for example of titanium dioxide and silicon dioxide, 20 to 30 alternating layers are necessary in order to obtain a 100% absorption in a wave length region.

EXAMPLE 2

Fine glass beads, diameter about 70μ, of the type that is used for coating projector screens, are suspended in water (1 kg. glass beads per 2 liters of water). The pH value of such a suspension is alkaline; it is made acidic by the addition of dilute aqueous hydrochloric acid to about 2.5. After heating to about 80° C., the pH value increases again. This addition of hydrochloric acid is continued until a determined pH value of 2.5 remans unchanged over a period of several hours.

The glass beads are then washed and dried. 550 g. of the thus-treated glass beads are suspended in 1 liter of water. Under stirring and heating to 74° C., 680 ml. of a 0.0324 molar titanium III chloride solution, being 0.118 N hydrochloric acid, are fed into this suspension, with a feed rate of 120 ml./h., along with 670 ml. of a 0.22 N sodium hydroxide solution at a feed rate of 120 ml./h., this feeding procedure lasting for 5 hours and 40 minutes. The proportion of TiO₂ per m.² per minute is $5.2 \times 10^{-6}$.

After filtration, the beads are coated with a uniform titanium dioxide layer which is perceptible under the microscope. The reflection power of the coated glass beads is strongly increased, as can be seen from a comparison to a standard (magnesium oxide) material, and the untreated starting material.

EXAMPLE 3

Graphite, such as is commercially used for heating baths, is ground wet with water in a ball mill and passed through a sieve having a mesh size of 75μ; then it is filtered and dried. 10 g. of the thus-treated graphite are suspended in 1 liter of water and heated to 74° C. under stirring.

To the resultant suspension, at a feed rate of 225 ml./h., a dilute titanium III chloride solution according to Examples 1 and 2 is added through a metering device. After 20 ml. of this solution have been fed, a 0.22 N sodium hydroxide solution is fed via a second metering device, at the same feed rate. During the experiment, a weak stream of air is conducted into the suspension. After a consumption of 1,818 ml. titanium III chloride solution and 1,800 ml. sodium hydroxide solution, the experiment is terminated. The pH value after the reaction is finished amounts to 2.1. The graphite is removed by filtering, washed free from chloride with hot water, and dried at 200° C.

The resultant graphite exhibits a bronze color; the content in titanium dioxide amounts to 29.6% TiO₂. The suspension liquid is clear; no titanium can be shown to be present therein.

EXAMPLE 4

12.8 g. polyamide powder having an average particle size of about 10μ are suspended in 500 ml. of water under strong agitation and heated to 74° C. Into this suspension (pH 3.7), there is fed at a rate of 60 ml./h. a dilute titanium III chloride solution—according to Examples 1 to 3—through a metering device; this corresponds to a feed rate of about $5 \times 10^{-6}$ moles per minute per m.². After 10 minutes, the suspension has adjusted to a pH value of 2.4. Now, a 0.22 N sodium hydroxide solution is added, at the same feed rate, via a second metering device. After a consumption of 420 ml. titanium III chloride solution and 410 ml. sodium hydroxide solution (7 hours), the experiment is terminated. The final pH amounts to 2.4. The polyamide powder is filtered off, washed free from chloride in warm water, and dried at 80° C.

The resultant polyamide powder has a slightly yellowish color and contains 7.9% titanium dioxide. In the clear mother liquor, no titanium can be proven to exist. Under the microscope, no agglomerates can be observed in the treated material, in contradistinction to the untreated material. The friability was substantially increased by the titanium dioxide coating process.

EXAMPLE 5

10 g. of mica, ground in wet form, of the commercial type ORS having a surface area of about 3 m.²/g. are suspended in one liter of water. The suspension has a pH of 6.8. It is heated under stirring to 74° C. During the coating process, a gentle stream of air is conducted through the suspension of means of a glass frit. With a metering pump, a 0.0167 molar titanium III sulfate solution in a 0.85 N sulfuric acid is added underneath the liquid level at a feed rate of 225 ml./h. After the pH of the suspension has fallen to 2.2–2, which takes 5 minutes, a 0.96 N sodium hydroxide solution is added to the suspension through a second metering pump.

The progressive coating of the mica surface with the titanium dioxide hydrate can be seen from the occurrence of Newton's interference colors. The iridescence of the mica laminae in the suspension, which was weak at the beginning of the experiment, becomes stronger with the progression of the test.

The final pH ranges between 1.9 to 1.7. The proportion of the molar number of titanium dioxide per m.² per minute is, under the conditions of the example, $4 \times 10^{-6}$. After having reached the desired hue, the suspension is filtered off, washed free from chloride with hot water, and dried at 200° C. Half of the thus-obtained substance is roasted at 500° C. Drying and roasting do not result in a change in the interference colors. The X-ray diagram of both products shows, in addition to the lines of the mica, those of anatase. In the test vessel a very uniform coating can be seen on the walls and on the bottom, proven by the uniform interference color.

TABLE 2

| | |
|---|---|
| Duration | 5ʰ 00' |
| Consumption of: | |
| 0.0167 molar $Ti_2(SO_4)_3$ solution (ml.) | 1125 |
| 0.96 normal NaOH (ml.) | 1107 |
| Percent $TiO_2$ in the final product: | |
| 200° C. | 22.7 |
| 500° C. | 23 |
| Color | White |

EXAMPLE 6

Under stirring, 1.2 liter of a 1 N sulfuric acid are slowly added to a solution of 2.6 g. sodium chloride, 3.3 g. potassium chloride, and 10.5 g. barium chloride dihydrate in 5.9 liters of water, at room temperature. During the addition of the sulfuric acid, the barium sulfate precipitates as a slightly iridescing sediment. The precipitate is allowed to settle, and decanting is conducted three times with 2 liter portions of deionized water. The yield amounts to 10 g. barium sulfate.

Under the microscope, the crystals exhibit star-shaped growths which show, at incident light, irregular colors of thin laminae. The size of the crystal in the plane of the laminae is in the range of 50–70μ; the thickness of the crystal is about 1μ.

6 g. of such a barium sulfate are suspended in 1 liter of water, and the suspension is heated to 74° C. Under stirring, a 0.0324 molar titanium III chloride solution, being 0.118 N hydrochloric acid, is added to the solution, underneath the level of the liquid. The feed rate amounts to 22.5 ml. per hour. After 15 minutes, the suspension has reached a pH of 2.2. Now, a 0.22 N sodium hydroxide solution is allowed to flow into the suspension, at the same rate of feed.

After 1 hour, the feed rate of both solutions is increased to 45 ml. per hour. After one additional hour has pased, the feed rate is increased first to 90 ml. per hour and then, after still another hour, to a rate of 120 ml. per hour for both solutions. During the experiment, evaporated water is replaced from time to time, so that the volume of the suspension is kept substantially constant at 1 liter. After a total of 4 hours, the experiment is terminated. The final pH ranges between 1.8–2. In the mother liquor, no dissolved titanium III salt or colloidal titanium dioxide hydrate can be detected.

The iridescence of the barium sulfate crystals is increased. The color is white. The crystals are filtered, washed free from chloride with hot water, and dried at 200° C.; the content of titanium dioxide amounts to 10.7%.

EXAMPLE 7

In a 5 liter glass beaker, 30 g. mica powder of a specific surface of 3.37 m.²/g. determined according to BET are suspended, under stirring, in 1 liter of desalted water and heated to 75° C. By means of a metering device, there is first added dropwise a 0.132 m. titanium (IV) chloride solution which is 0.948 N in hydrochloric acid at a feed rate of 120 ml. per hour. As soon as the pH of the suspension has decreased to about 2, a 1.475 N sodium hydroxide solution is added through a second metering device at the same feed rate; this corresponds to a precipitation rate of $2.61 \times 10^{-6}$ moles $TiO_2$/m.²/min. The known color stages are passed. After achieving the desired color tone, the pigment is removed by filtering, washed neutral with desalinated water, dried at 120° C., and baked at 950° C.

The preceding examples can be repeated with similar success by substituting the generically and specifically described reactants and operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usage and conditions. Consequently, such changes and modifications are properly, equitably, and intended to be, within the full range of equivalence of the following claims.

What is claimed is:

1. A process for the production of nacreous pigments having coatings of uniform thickness based on titanium dioxide, which process comprises feeding two solutions concurrently to an aqueous suspension of particulate solid material to be coated, maintaining said suspension at a temperature of about 50–100° C. and at a substantially constant pH between 0.5 and 3.5, said two solutions consisting essentially of
    (a) an aqueous 0.001 to 0.2 molar solution of a titanium salt having a content in free acid corresponding to a normality of 0.002 to 1.5; and
    (b) an aqueous 0.025 to 8 normal alkali metal base, with the provisions that the feeding of the alkali metal base is maintained so that it is just capable of neutralizing the acid contained in the titanium salt solution as well as the acid produced during the reaction, and that the quantity of titanium salt added per minute is kept within the order of magnitude of about 0.01 to $20 \times 10^{-5}$ moles per square meter of surface to be coated, and drying the coated particulate solids.

2. A process as defined by claim 1 wherein the reaction is conducted at a temperature between 70 and 80° C., at a pH of 1.5 to 2.5, and at a feed rate of the titanium salt of less than $5 \times 10^{-5}$ moles per minute per square meter of the surface to be coated.

3. A process as defined by claim 1 wherein the material to be coated comprises particulate mica flakes.

4. A process as defined by claim 2 wherein the material to be coated comprises particulate mica flakes.

5. A process as defined by claim 1 wherein the titanium salt is a titanium IV salt.

6. A process as defined by claim 5 wherein the material to be coated comprises particulate mica flakes.

7. A process as defined by claim 2 wherein the titanium salt is a titanium IV salt.

8. A process as defined by claim 7 wherein the material to be coated comprises particulate mica flakes.

9. A process as defined by claim 1 wherein the titanium salt is a titanium III salt, and further comprising concurrently adding air to said suspension.

10. A process as defined by claim 9 wherein the material to be coated comprises particulate mica flakes.

11. A process as defined by claim 9 wherein the reaction is conducted at a temperature between 70 and 80° C., at a pH of 1.5 to 2.5, and at a feed rate of the titanium salt of less than $5 \times 10^{-5}$ moles per minute per square meter of the surface to be coated.

12. A process as defined by claim 11 wherein the material to be coated comprises particulate mica flakes.

13. A process as defined by claim 12 wherein the titanium III salt is titanium III chloride or titanium III sulfate.

14. A process as defined by claim 1, further comprising the step of heating the coated particles to about 950° C.

(References on following page)

References Cited

UNITED STATES PATENTS

| | | |
|---|---|---|
| 2,872,358 | 2/1959 | Fry. |
| 2,941,895 | 6/1960 | Haslam. |
| 3,004,875 | 10/1961 | Lytle. |
| 3,071,482 | 1/1963 | Miller. |
| 3,087,828 | 4/1963 | Linton. |
| 3,087,829 | 4/1963 | Linton. |
| 3,146,119 | 8/1964 | Ritter _____ 106—300 |
| 3,244,639 | 4/1966 | Mindick et al. |
| 3,383,231 | 5/1968 | Allan _____ 106—308X |

WILLIAM D. MARTIN, Primary Examiner

U.S. Cl. X.R.

117—159, 169, 221